Nov. 10, 1953 R. KLOSS 2,658,493
CYLINDER HEAD FOR DIESEL ENGINES
Filed Aug. 11, 1951
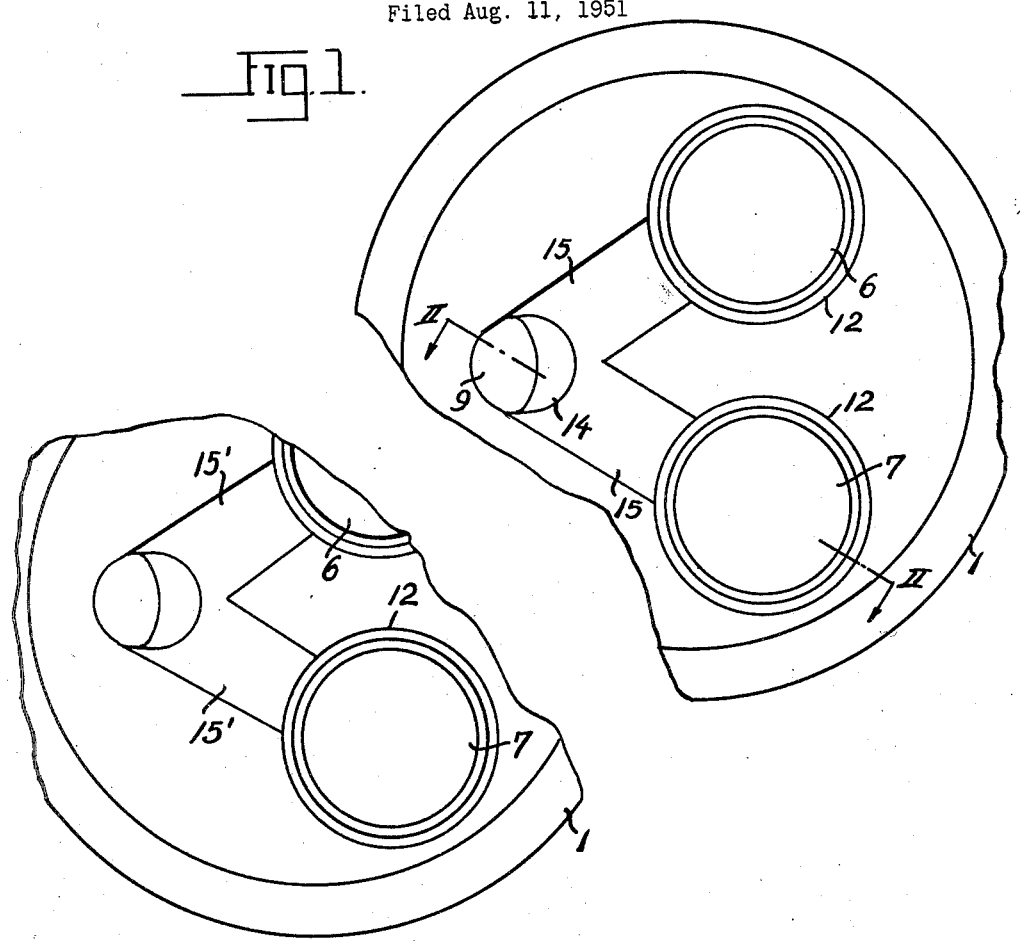
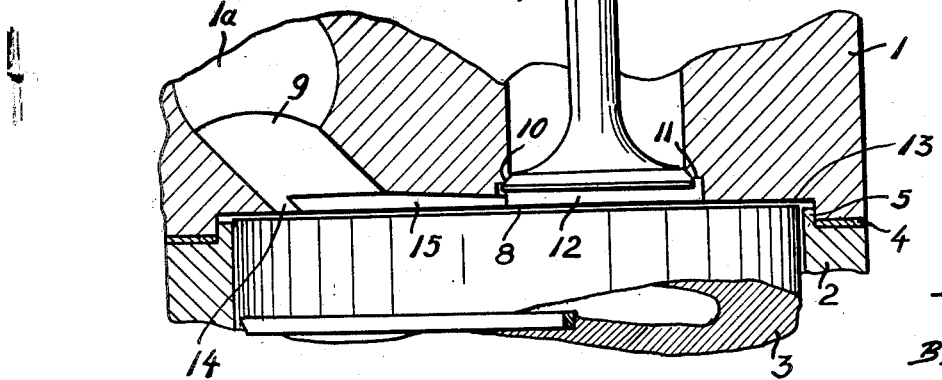
INVENTOR:
Richard Kloss
By
Patent Agent Patented Nov. 10, 1953

2,658,493

UNITED STATES PATENT OFFICE 2,658,493

CYLINDER HEAD FOR DIESEL ENGINES

Richard Kloss, Koln-Buchforst, Germany, assignor to Klockner-Humboldt-Deutz A. G., Koln, Germany Application August 11, 1951, Serial No. 241,468

Claims priority, application Germany February 1, 1951

7 Claims. (Cl. 123—191)

The present invention relates to internal combustion engines and, more particularly, to diesel engines the cylinder head of which has provided therein a precombustion chamber separate from the main combustion chamber and communicating with the latter through a throat. The precombustion chamber is so dimensioned that in the upper dead center point of the piston, nearly the entire combustion air will be received by said precombustion chamber. The bottom surface of the cylinder head is furthermore provided with depressions including valve faces for cooperation with the inlet and outlet valves which are suspended in the cylinder head.

It is an object of this invention to provide an arrangement for use in connection with a diesel engine of the type set forth above which will bring about a better distribution of the gases, leaving the throat, over the cylinder space.

It is another object of this invention to provide a cylinder head for a four-stroke cycle diesel engine which is provided with a precombustion chamber communicating through a throat with the main combustion chamber, in which the gas stream leaving the throat is deviated so that a thermic relief of the web between the valves will be obtained.

It is still another object of this invention to provide a diesel cylinder head having a precombustion chamber and being provided with depressions comprising the valve faces of the inlet and outlet valves, which will bring about an improved combustion of the air accumulating in said depressions.

Another object of this invention consists in the provision of a cylinder head having a precombustion chamber adapted to communicate with the main combustion chamber through a throat, which will improve the combustion, while allowing the use of a piston with a plain head surface.

It is a still further object of this invention to provide a cylinder head of the type set forth in the preceding paragraphs, which will make it possible to reduce the volume of the main combustion chamber to a minimum.

These and other objects and advantages of the invention will appear more clearly from the following specification in connection with the accompanying drawings in which: Figure 1 illustrates a bottom view of a cylinder head according to the present invention.

Figure 2 represents a section along the line II—II of Figure 1.

Figure 3 shows a slight modification over Figure 1 with regard to the connecting channels in the bottom of the cylinder head.

General arrangement

According to the present invention, the bottom surface of the cylinder head is provided with channel means preferably in the form of grooves which extend from the mouth of the throat at its entrance into the main combustion chamber to the recesses which contain the valve surfaces for the inlet and outlet valves. These channel means or grooves may have a width corresponding to the width or diameter of the mouth of said throat. However, in certain instances it may be more advantageous if the width of the channel means or grooves decreases towards the said recesses. As to the depth of said channel means or grooves, the depth preferably equals that of the recesses but, if desired, may also be greater than that of the depth of said recesses. In certain instances it may be preferable that the depth of said channel means or grooves decreases toward the recesses.

Structural arrangement

Referring now to the drawings in detail, the cylinder head shown therein is designated by the reference numeral 1 and rests by means of a gasket 4 upon the cylinder 2 on which the cylinder head 1 is centered by means of a flange 5. The reference numeral 3 designates the piston reciprocally mounted in the cylinder 2. The cylinder head 1 has suspended therein an inlet valve 6 and an outlet valve 7. The cylinder head 1 furthermore comprises a precombustion chamber 1a which is so dimensioned that in the upper dead center point of the piston 3 nearly the entire combustion air will be received by said precombustion chamber. The precombustion chamber communicates with the main combustion chamber 8 through a throat 9. In order that the valves 6 and 7 may perform their opening strokes, the valve faces 10 for the valves 6 and 7 are machined into the bottom surfaces 11 of recesses 12 arranged in the bottom surface 13 of the cylinder head.

According to the present invention, the cylinder head is provided with channel means or grooves 15 which extend from the mouth 14 of the throat 9 to the recesses 12. In the structure shown in the drawing, the lateral surfaces of the grooves 15 are arranged parallel to each other, while the depth of these grooves decreases toward the recesses 12. The grooves 15 may, however, also be so arranged that its width decreases toward the recesses 12 as indicated in Figure 3. While preferably the depth of the grooves decreases towards the recesses 12, it is of course understood that the invention is by no means limited to this arrangement and that, if desired, the depth may be nearly the same throughout the length of the grooves 15.

The arrangement according to the present invention has the advantage that the hot gas stream leaving the throat is deviated by the thermically highly loaded web between the valves so that the hot gas stream passes by on both sides of the web and enters the recesses below the valves. In this way the air present in the recesses is caused to a far better extent to take part in the combustion.

A further advantage of the arrangement according to the present invention consists in that a piston with a plain top surface may be employed. It may be emphasized that with diesel engines having a cylinder head according to the present invention the volume of the main combustion chamber may be kept extremely small so that practically the entire air taking part in the combustion will at the end of the compression stroke be in the precombustion chamber. It is obvious that if corresponding gas guiding channels are machined into the piston as it is known per se, the volume of the main combustion chamber will automatically and materially be increased.

It is of course understood that the present invention is by no means limited to the particular construction shown in the drawings but also comprises any modifications within the scope of the appended claims.

What I claim is:

1. A cylinder head for diesel engines, which comprises in combination, a main combustion chamber partly formed by a portion of the bottom surface of said cylinder head, said bottom surface also being provided with a pair of spaced recesses comprising valve surfaces for cooperation with an inlet valve and an outlet valve respectively, a precombustion chamber provided in said cylinder head and spaced from said main combustion chamber, channel means effecting communication between said main combustion chamber and said precombustion chamber, and a pair of additional channel means provided in the bottom of said cylinder head and extending in V-formation from said first-mentioned channel means to said recesses.

2. A cylinder head for diesel engines, which comprises in combination, a main combustion chamber partly formed by a portion of the bottom surface of said cylinder head, said bottom surface also being provided with a pair of spaced recesses comprising valve surfaces for cooperation with an inlet valve and an outlet valve respectively, a precombustion chamber provided in said cylinder head and spaced from said main combustion chamber, throat means provided in said cylinder head and extending from said precombustion chamber to said main combustion chamber, and a pair of grooves respectively extending from the mouth of said throat means at said main combustion chamber to said recesses.

3. A cylinder head for diesel engines, which comprises in combination, a main combustion chamber partly formed by a portion of the bottom surface of said cylinder head, said bottom surface also being provided with a pair of spaced recesses comprising valve surfaces for cooperation with an inlet valve and an outlet valve respectively, a precombustion chamber provided in said cylinder head and spaced from said main combustion chamber, throat means provided in said cylinder head and extending from said precombustion chamber to said main combustion chamber, and a pair of grooves extending from the mouth of said throat means at said main combustion chamber to said recesses respectively, the width of said grooves substantially equalling the width or diameter of said throat means at the bottom surface of said cylinder head.

4. A cylinder head for diesel engines, which comprises in combination, a main combustion chamber partly formed by a portion of the bottom surface of said cylinder head, said bottom surface also being provided with a pair of spaced recesses comprising valve surfaces for cooperation with an inlet valve and an outlet valve respectively, a precombustion chamber provided in said cylinder head and spaced from said main combustion chamber, throat means provided in said cylinder head and extending from said precombustion chamber to said main combustion chamber, and a pair of grooves respectively extending from the mouth of said throat means at said main combustion chamber to said recesses, the width of said grooves decreasing towards said recesses.

5. A cylinder head for diesel engines, which comprises in combination, a main combustion chamber partly formed by a portion of the bottom surface of said cylinder head, said bottom surface also being provided with a pair of spaced recesses comprising valve surfaces for cooperation with an inlet valve and an outlet valve respectively, a precombustion chamber provided in said cylinder head and spaced from said main combustion chamber, channel means effecting communication between said main combustion chamber and said precombustion chamber, and a pair of grooves provided in the bottom surface of said cylinder head and extending from the mouth of said channel means at said bottom surface to said recesses respectively, the depth of said grooves substantially equalling the depth of said recesses.

6. A cylinder head for diesel engines, which comprises in combination, a main combustion chamber partly formed by a portion of the bottom surface of said cylinder head, said bottom surface also being provided with a pair of spaced recesses comprising valve surfaces for cooperation with an inlet valve and an outlet valve respectively, a precombustion chamber provided in said cylinder head and spaced from said main combustion chamber, channel means effecting communication between said main combustion chamber and said precombustion chamber, and a pair of grooves provided in the bottom surface of said cylinder head and extending from the mouth of said channel means at said bottom surface to said recesses respectively, the depth of said grooves being greater than the depth of said recesses.

7. A cylinder head for diesel engines, which comprises in combination, a main combustion chamber partly formed by a portion of the bottom surface of said cylinder head, said bottom surface also being provided with a pair of spaced recesses comprises valve surfaces for cooperation with an inlet valve and an outlet valve respectively, a precombustion chamber provided in said cylinder head and spaced from said main combustion chamber, channel means effecting communication between said main combustion chamber and said precombustion chamber, and a pair of grooves provided in the bottom surface of said cylinder head and extending from the mouth of said channel means at said bottom surface to said recesses respectively, the depth of said grooves decreasing toward said recesses.

RICHARD KLOSS.

References Cited in the file of this patent

FOREIGN PATENTS

| Number | Country | Date |
|---|---|---|
| 892,828 | France | Jan. 17, 1944 |